United States Patent
Allouche

(10) Patent No.: US 12,283,916 B2
(45) Date of Patent: Apr. 22, 2025

(54) BRIDGE FOR ROBOTIC CLEANING SOLUTION ON PHOTOVOLTAIC (PV) PANELS

(71) Applicant: Airtouch Solar Ltd., Beit Shemesh (IL)

(72) Inventor: Yanir Allouche, Tel Aviv (IL)

(73) Assignee: AIRTOUCH SOLAR LTD., Beit Shemesh (IL)

(*) Notice: Subject to any disclaimer, the term of this patent is extended or adjusted under 35 U.S.C. 154(b) by 0 days.

(21) Appl. No.: 18/209,725

(22) Filed: Jun. 14, 2023

(65) Prior Publication Data

US 2024/0056020 A1    Feb. 15, 2024

Related U.S. Application Data

(63) Continuation of application No. 16/997,854, filed on Aug. 19, 2020, now abandoned.

(60) Provisional application No. 62/889,070, filed on Aug. 20, 2019.

(51) Int. Cl.
  *H02S 40/10* (2014.01)
  *H02S 20/30* (2014.01)
  *B25J 11/00* (2006.01)

(52) U.S. Cl.
  CPC .............. *H02S 40/10* (2014.12); *H02S 20/30* (2014.12); *B25J 11/0085* (2013.01)

(58) Field of Classification Search
  CPC .......... H02S 40/10; H02S 40/12; H02S 40/36
  See application file for complete search history.

(56) References Cited

U.S. PATENT DOCUMENTS

| | | | |
|---|---|---|---|
| 10,250,184 B2 | 4/2019 | Newdoll et al. | |
| 2010/0047954 A1 | 2/2010 | Su et al. | |
| 2014/0109334 A1* | 4/2014 | Saraf | H02S 40/10 15/246 |
| 2015/0144179 A1 | 5/2015 | Chen et al. | |
| 2017/0070188 A1* | 3/2017 | Meyer | H02S 20/30 |
| 2018/0241343 A1 | 8/2018 | Jiang et al. | |
| 2019/0165722 A1 | 5/2019 | Zou et al. | |
| 2019/0326847 A1* | 10/2019 | Zuritis | F16B 5/0685 |

FOREIGN PATENT DOCUMENTS

| | | |
|---|---|---|
| CN | 102574166 B | 6/2015 |
| CN | 105577100 A | 5/2016 |
| JP | 2010538476 A | 12/2010 |

* cited by examiner

*Primary Examiner* — Daniel P Malley, Jr.
(74) *Attorney, Agent, or Firm* — Reches Patents

(57) ABSTRACT

A bridge that may include a first photovoltaic (PV) panel holder, a second PV panel holder; and a body. The body is movably coupled, via a first interface, to the first PV panel holder and is detacheably coupled to the second PV panel holder, wherein the body is configured to move between a first position to a second position when the second PV panel holder is detached from the body, wherein when positioned at the second position, a portion of the body extends above the first PV panel holder.

15 Claims, 15 Drawing Sheets

BRIDGE FOR ROBOTIC CLEANING SOLUTION ON PHOTOVOLTAIC (PV) PANELS

CROSS REFERENCE

This application claims priority from U.S. provisional patent 62/889,070 having a filing date 20 Aug. 2019 which is incorporated herein by reference.

BACKGROUND

PV panels are mounted on racks/tables where each table carries 10-60 panels in big rectangle shape. Robotic cleaning solution needs to have a clear path to run on steps or gaps between the panels, which above certain limit stop the robot from running smoothly.

New generation of robotic solutions are driving on the panels' frame and do not need a special rail to run on. Along the Rack/Table, since the gaps between the panels is limited to 10-30 mm the wheels of normal robots can run over those gaps easily.

The challenge, however, is to allow the robot to run between 2 tables that are located next to each other. In this case a bridge between 2 adjacent tables is needed to use one robot for cleaning of multiple tables. This allows the developer to save CAPEX.

Tables usually are aligned, but in many cases, due to lack of QC in the construction phase or due to difficult terrain, tables have misalignments between them.

Further, some of the tables can change their tilting along the day or few times during the year. This tilt movement can cause aligned tables after tilt changing to become misaligned.

SUMMARY

There may be provided a bridge that may include a first photovoltaic (PV) panel holder; a second PV panel holder; and a body. The wherein the body may be movably coupled, via a first interface, to the first PV panel holder and may be detacheably coupled to the second PV panel holder. The body may be configured to move between a first position to a second position when the second PV panel holder may be detached from the body, wherein when positioned at the second position, a portion of the body extends above the first PV panel holder.

The bridge, when positioned at the first position the portion of the body, may not extend above the first PV panel holder.

When the body is positioned at the second position, the portion of the body may form a stopper to prevent progress of a cleaning robot towards the second PV panel holder.

The portion of the body may have a rectangular shape.

The first interface may be a first axle, wherein the body may be configured to move between the first position to the second position by performing a rotational movement, wherein the body may be rotatably coupled, via the first axle, to the first PV panel holder.

The body may be configured to move along the first axle.

The body may include a groove that may have an open end, wherein the second PV panel holder may include a second interface that may be configured to mechanically couple the body to the second PV panel holder while the second interface contacts the groove, and wherein the second interface may be configured to move along the groove while a distance between the first PV panel holder and the second PV panel holder changes within a predefined distance range.

The second interface may be configured to exit the groove and disconnect the second PV panel holder from the body when the distance between the first PV panel holder and the second PV panel holder exceeds the predefined distance range.

The body may include a curved upper edge that may be located above the open end.

The first the interface may be a rounded pin.

The first PV panel holder may include an upper part, an intermediate part and a lower part, wherein the first interface may be connected to the intermediate part.

The bridge may include or may be monitored by a sensor that may be configured to sense a position of the body.

At least one of the body, the first PV panel holder and the second PV panel holder may be flexible.

There may be provided a photovoltaic (PV) system. The system may include a bridge, a first PV panel and a second PV panel.

The bridge may include a first PV panel holder, a second PV panel holder and a body. The body is movably coupled, via a first interface, to the first PV panel holder and is detacheably coupled to the second PV panel holder. The body is configured to move between a first position to a second position when the second PV panel holder is detached from the body. When positioned at the second position, a portion of the body extends above the first PV panel holder.

The first PV panel may include a first plurality of PV panels and is mechanically coupled to the first PV panel holder of the bridge.

The second PV panel may include a second plurality of PV panels, the second PV panel is mechanically coupled to the second PV panel holder of the bridge.

The PV system may include two or more bridges formed between the first and second PV panels. For example—if the cleaning robot has two tracks, two sets of wheels (each set of wheels includes wheels that move along a same virtual line) then there may be two bridges that support each one of the two tracks, two wheels or two sets of wheels during the movement from one PV panel to the other.

The system may include at least one sensor for sensing a position of each one of the bridges. For example—if a bridge is in the second position—then an alert may be generated, a notification should be provided—to inform a user or any human or computerized entity that the bridge will not allow a passage of the cleaning robot over the bridge.

The sensor may be a part of the bridge or may not belong to a bridge.

There may be provided a method for moving a cleaning robot between a first photovoltaic (PV) panel and a second PV panel. The method may include (a) reaching, by the cleaning robot a first end of the first PV panel, (b) stopping the progress of the cleaning robot when the cleaning robot reaches a stopper, and (c) propagating the cleaning robot above bridges and between the first PV panel and the second PV panel when the cleaning robot does not reach the stopper.

Each one of the bridges may include a first PV panel holder that is connected to the first PV panel, a second PV panel holder that is connected to the second PV panel, and a body, wherein the body is movably coupled, via a first interface, to the first PV panel holder and is detacheably coupled to the second PV panel holder, wherein the body is configured to move between a first position to a second position when the second PV panel holder is detached from the body, wherein when positioned at the second position, a portion of the body extends above the first PV panel holder to provide the stopper.

The method may also include cleaning, by the cleaning robot, the first PV panel before moving over the bridges.

The method may include sensing positions of bodies of the bridges and responding to the sensing.

There may be provided a bridge that may include a first photovoltaic (PV) panel holder, a second PV panel holder, and a body. The body may be movably coupled, via a first interface to the first PV panel holder and may be movably coupled, via a second interface to the second PV panel holder. Wherein each one of the first PV panel holder and the second PV panel holder may include a base surface, a central segment extends from the base surface, and two side segments that extend from the base surface. A distance between the base surface and first part of the central segment exceeds a distance between the base surface and a first part of each one of the side segments.

Each one of the (a) distance between the base surface and first part of the central segment, and (b) the distance between the base surface and a first part of each one of the side segment, may be of millimetric scale.

The distance between the base surface and first part of the central segment, substantially equals a sum of (b) a thickness of the body and (c) the distance between the base surface and the first part of one of the side segments.

The body may be elastic. The first and second PV holders may also be elastic.

Each one of the first interface and the second interface may be an axel, wherein the body may be rotatably coupled to the first PV panel holder and to the second PV panel holder.

A length of each one of the first interface and the second interface may be of millimetric scale.

The first PV panel holder may include an upper part, an intermediate part and a lower part, wherein the lower part may be made of foldable segments.

The foldable segments may include upper protuberances and external recesses.

In each one of the first PV panel holder and the second PV panel holder, a base surface segment positioned between the central segment and a side segment may be configured to provide a folding region for folding the body.

There may be provided a photovoltaic (PV) system may include a bridge that may include a first PV panel holder, a second PV panel holder and a body, wherein the body may be movably coupled, via a first interface to the first PV panel holder and may be movably coupled, via a second interface to the second PV panel holder; wherein each one of the first PV panel holder and the second PV panel holder may include a base surface, a central segment extends from the base surface, and two side segments that extend from the base surface, wherein a distance between the base surface and first part of the central segment exceeds a distance between the base surface and a first part of each one of the side segments; a first PV panel that may include a first plurality of PV panels and may be mechanically coupled to the first PV panel holder of the bridge; and a second PV panel that may include a second plurality of PV panels, the second PV panel may be mechanically coupled to the second PV panel holder of the bridge.

There may be provided a method for cleaning PV panels using a cleaning robot that is configured to move across one or more bridges.

BRIEF DESCRIPTION OF THE DRAWINGS

The accompanying drawings, which are incorporated in and constitute a part of this disclosure, illustrate various disclosed embodiments. In the drawings.

DETAILED DESCRIPTION OF THE DRAWINGS

Figure 1:
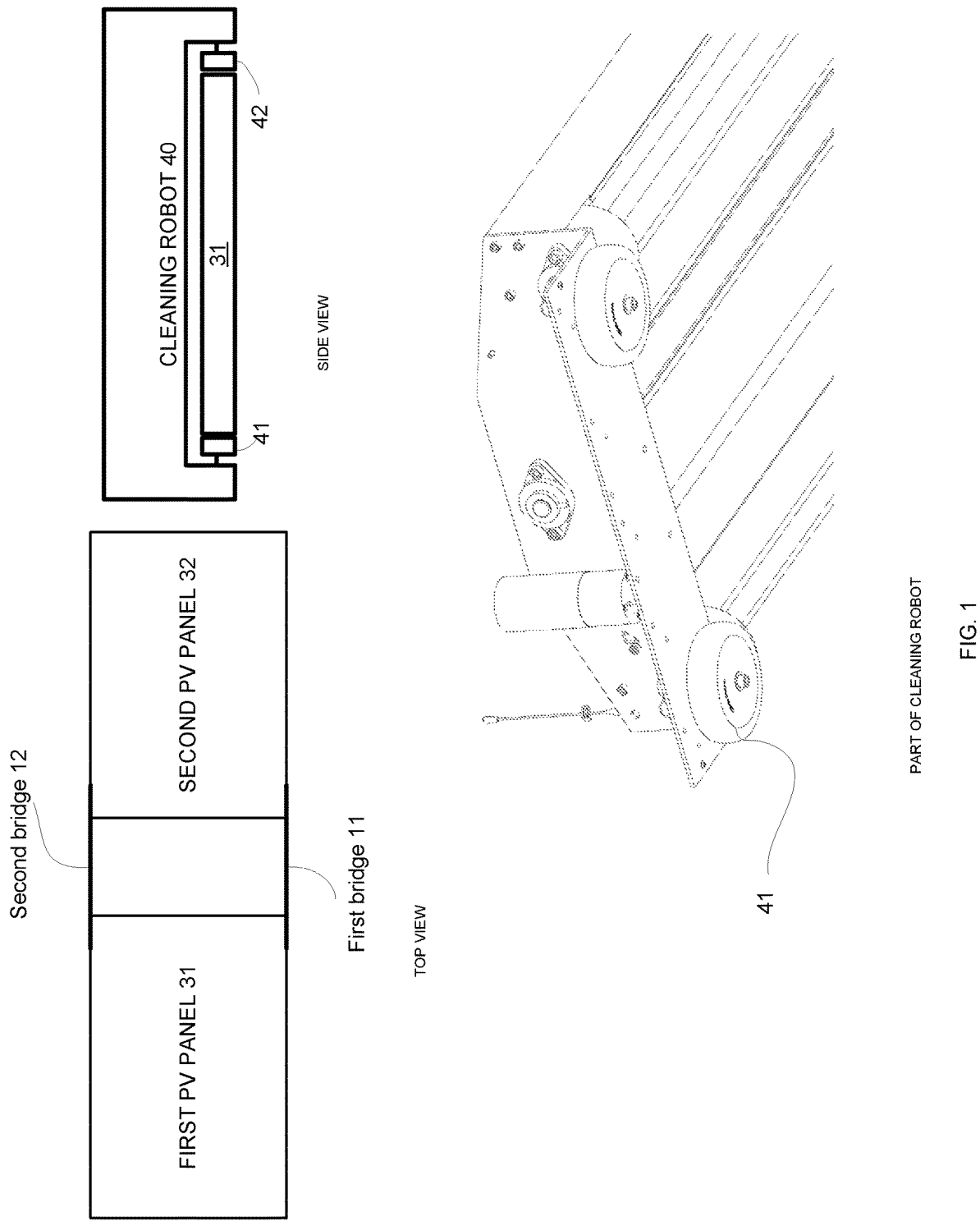
FIG. 1 illustrates misalignments.

Any reference in the specification to a bridge should be applied mutatis mutandis to a method for using the bridge and/or a method for manufacturing the bridge.

There may be provided a bridge that is able to carry the weight of the cleaning robot between the panel tables while allowing freedom in misalignment without changing the bridges each season or during the day.

The bridge provides a single solution for multiple situations. In such case a single configuration of the bridge can be manufactured in mass scale to serve most situations in a field and will not require a tailored solution for each and every table situation.

There may be provided a bridge that may include a first photovoltaic (PV) panel holder; a second PV panel holder; and a body. The wherein the body may be movably coupled, via a first interface, to the first PV panel holder and may be detacheably coupled to the second PV panel holder. The body may be configured to move between a first position to a second position when the second PV panel holder may be detached from the body, wherein when positioned at the second position, a portion of the body extends above the first PV panel holder. FIGS. 1-6 provide examples of such a bridge.

The bridge, when positioned at the first position the portion of the body, may not extend above the first PV panel holder.

When the body is positioned at the second position, the portion of the body may form a stopper to prevent progress of a cleaning robot towards the second PV panel holder.

The portion of the body may have a rectangular shape.

The first interface may be a first axle, wherein the body may be configured to move between the first position to the second position by performing a rotational movement, wherein the body may be rotatably coupled, via the first axle, to the first PV panel holder.

The body may be configured to move along the first axle.

The body may include a groove that may have an open end, wherein the second PV panel holder may include a second interface that may be configured to mechanically couple the body to the second PV panel holder while the second interface contacts the groove, and wherein the second interface may be configured to move along the groove while a distance between the first PV panel holder and the second PV panel holder changes within a predefined distance range.

The second interface may be configured to exit the groove and disconnect the second PV panel holder from the body when the distance between the first PV panel holder and the second PV panel holder exceeds the predefined distance range.

The body may include a curved upper edge that may be located above the open end.

The first the interface may be a rounded pin.

The first PV panel holder may include an upper part, an intermediate part and a lower part, wherein the first interface may be connected to the intermediate part.

The bridge may include or may be monitored by a sensor that may be configured to sense a position of the body.

At least one of the body, the first PV panel holder and the second PV panel holder may be flexible.

There may be provided a photovoltaic (PV) system. The system may include a bridge, a first PV panel and a second PV panel.

The bridge may include a first PV panel holder, a second PV panel holder and a body. The body is movably coupled, via a first interface, to the first PV panel holder and is detacheably coupled to the second PV panel holder. The body is configured to move between a first position to a second position when the second PV panel holder is detached from the body. When positioned at the second position, a portion of the body extends above the first PV panel holder.

The first PV panel may include a first plurality of PV panels and is mechanically coupled to the first PV panel holder of the bridge.

The second PV panel may include a second plurality of PV panels, the second PV panel is mechanically coupled to the second PV panel holder of the bridge.

The PV system may include two or more bridges formed between the first and second PV panels. For example—if the cleaning robot has two tracks, two sets of wheels (each set of wheels includes wheels that move along a same virtual line) then there may be two bridges that support each one of the two tracks, two wheels or two sets of wheels during the movement from one PV panel to the other.

The system may include at least one sensor for sensing a position of each one of the bridges. For example—if a bridge is in the second position—then an alert may be generated, a notification should be provided—to inform a user or any human or computerized entity that the bridge will not allow a passage of the cleaning robot over the bridge.

The sensor may be a part of the bridge or may not belong to a bridge.

There may be provided a method for moving a cleaning robot between a first photovoltaic (PV) panel and a second PV panel. The method may include (a) reaching, by the cleaning robot a first end of the first PV panel, (b) stopping the progress of the cleaning robot when the cleaning robot reaches a stopper, and (c) propagating the cleaning robot above bridges and between the first PV panel and the second PV panel when the cleaning robot does not reach the stopper. Each one of the bridges may include a first PV panel holder that is connected to the first PV panel, a second PV panel holder that is connected to the second PV panel, and a body, wherein the body is movably coupled, via a first interface, to the first PV panel holder and is detacheably coupled to the second PV panel holder, wherein the body is configured to move between a first position to a second position when the second PV panel holder is detached from the body, wherein when positioned at the second position, a portion of the body extends above the first PV panel holder to provide the stopper.

The method may also include cleaning, by the cleaning robot, the first PV panel before moving over the bridges.

The method may include sensing positions of bodies of the bridges and responding to the sensing.

There may be provided bridges that are flexible and may be coupled between two PV panels despite alignments in one, two and even three axes. The bridge may include a body movably coupled between first and second PV holders. The bridge may have pivots and knees.

FIG. 1 illustrates two PV panels 31 and 32 and a cleaning robot 40 that has side wheels 41 and 42 that interface with a first bridge 11 and a second bridge 12 between the two PV panels.

When a PV is tilted in relation to an adjacent PV there is a two axes misalignments Y & Z. The X axes can be misaligned when tables are mounted wrongly with varied distances between them.

Figure 2:
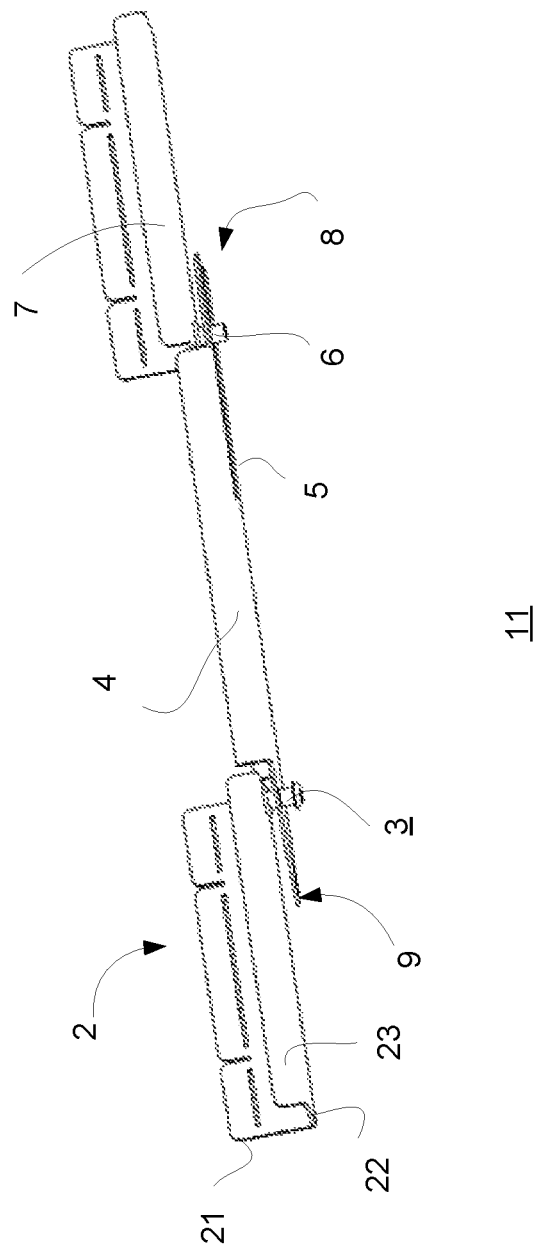
FIGS. 2-6 illustrate examples of bridges.

FIG. 2 illustrates an example of a first bridge 11 that is designed to answer misalignment in three axes without any modifications to the bridge.

The first bridge 11 (may also be referred to as a flexible bridge or adaptable bridge) may include first PV panel holder 2, second PV panel holder 7 and body 4.

The first PV panel holder 2 has a first pin 3 and the second PV holder 7 has a second pin 6. The pins may be mechanically coupled to spring disks to allow the movement in the Y axes (towards the PV panels and away from the PV panels). These pine also allow rotational movement.

The body 4 has a groove 5 to provide the flexibility for misalignment in the X Axes. When two PV panels are misaligned the distance between the corners of the two PV panels tables gets larger. Edge 8 of body 4 has a curve shape that provides a smooth path for the wheel in all angles.

A part 9 of the body is designed to generate a stopper when the misalignment is crossing the tilt limitation of the robot, in such case the main body 4 disconnects from the second PV holder 7, and due to gravity the body 4 falls down and the part 9 is elevated and stops the robot from continuing to run.

In FIG. 2 each one of the first and second PV panel holder has a lower part, an intermediate part and an upper part—see in relation to the first PV panel holder 2—upper part 23, an intermediate part 22 and a lower part 21. The parts are oriented to each other.

Figure 3:
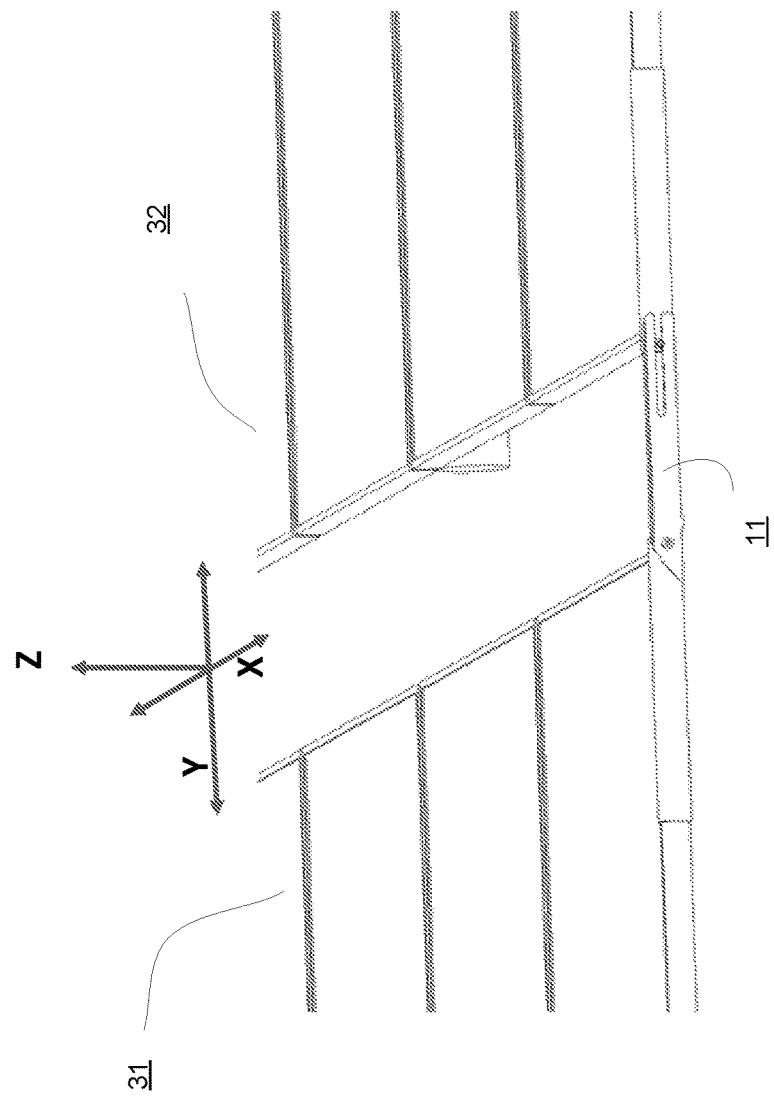
Figure 4:
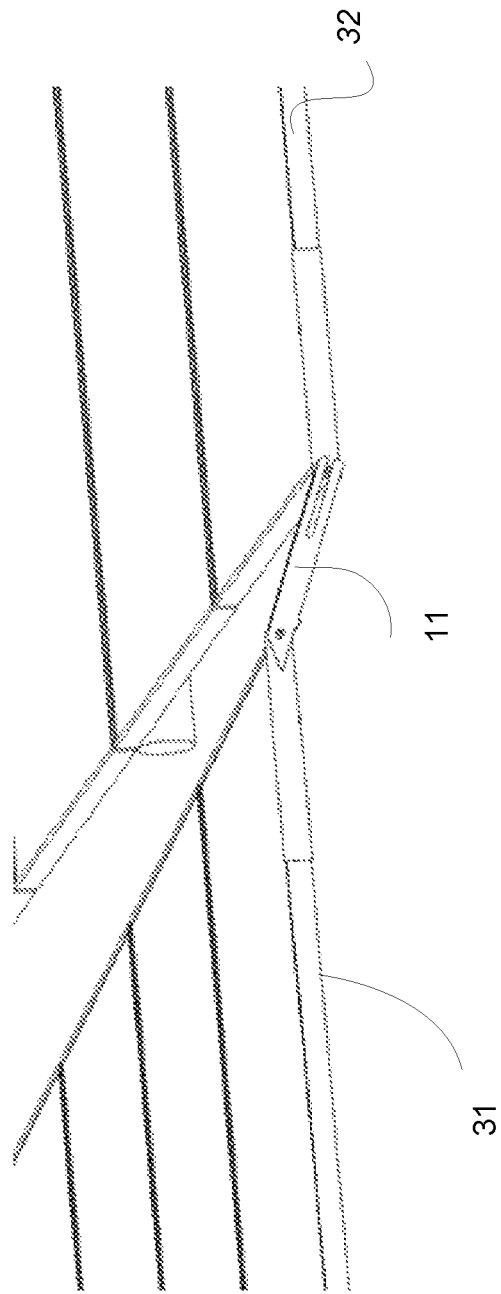
Figure 5:
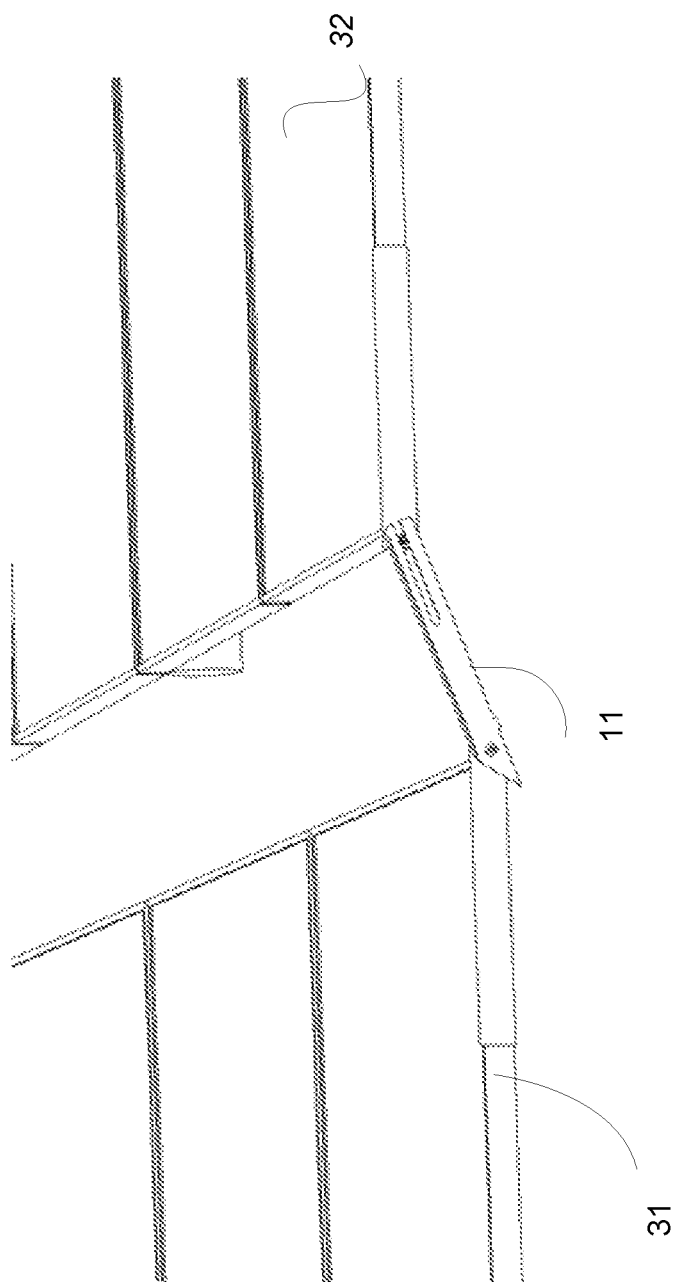
Figure 6:
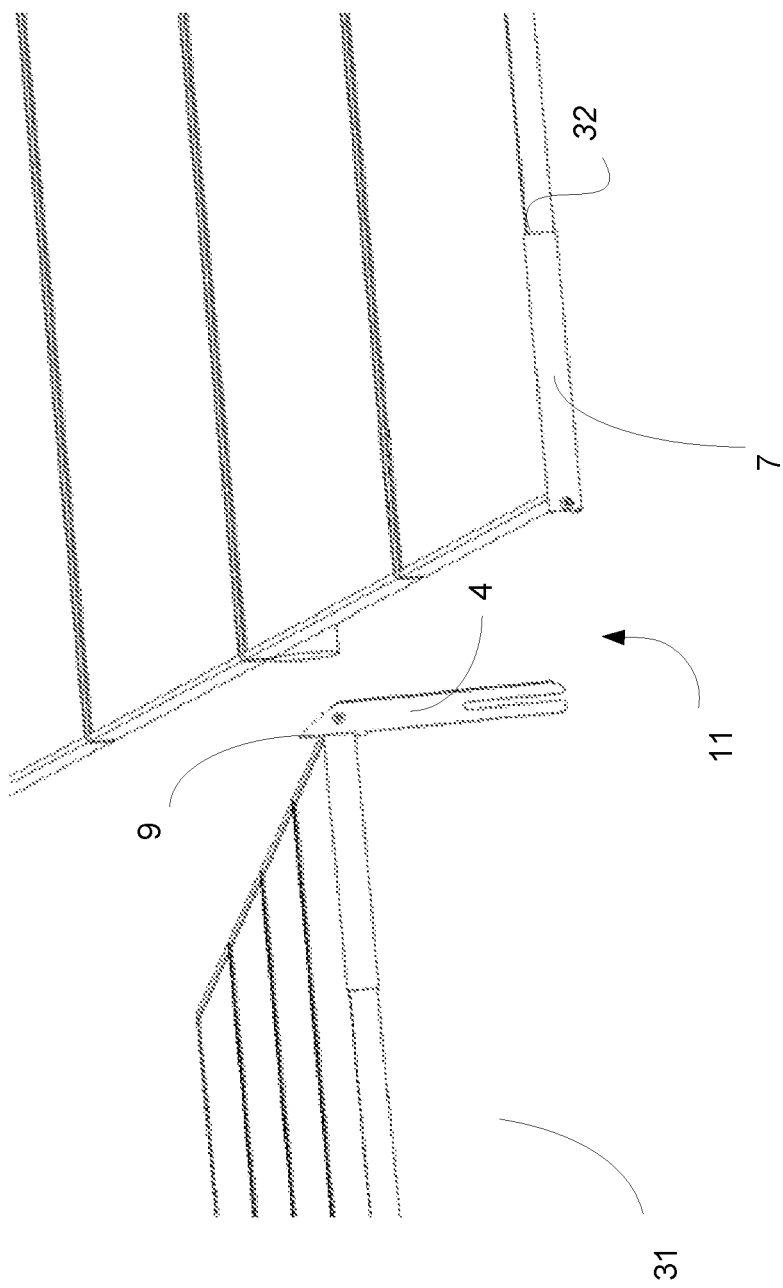

FIG. 3 shows fully aligned PV panels 31 and 32 and first bridge 11. FIG. 4 shows misalignment in one direction between the PV panels 31 and 32. FIG. 5 shows misalignment in the second direction between the PV panels 31 and 32. In FIGS. 3-5 the body of the first bridge is mechanically coupled to the first and second PV panel holders and provides to the robot wheels a path that is smooth with no steps. FIG. 6 shows flexible bridge corner (9) after the distance between the first and second PV panels exceeds a predefined threshold and the body 4 is disconnected from the second PV panel holder—while part 9 extends above the first PV panel and acts as a stopper.

The bridges illustrated in FIG. 1-6 may be used for PV panels that are movable—such as PV panels of trackers that may move during the day in order to trach after the sun.

Figure 7:
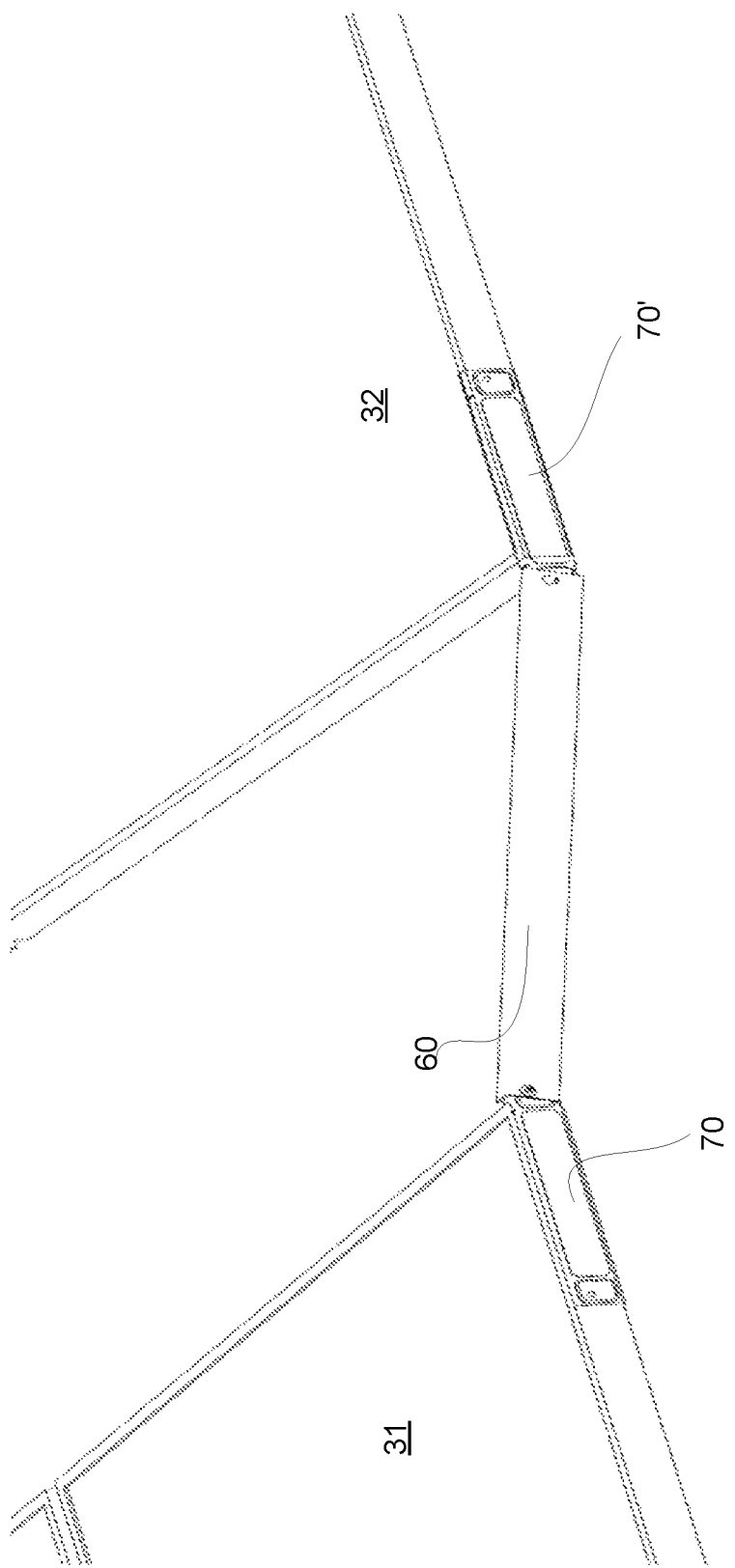
FIG. 7-15 illustrate examples of bridges.
Figure 8:
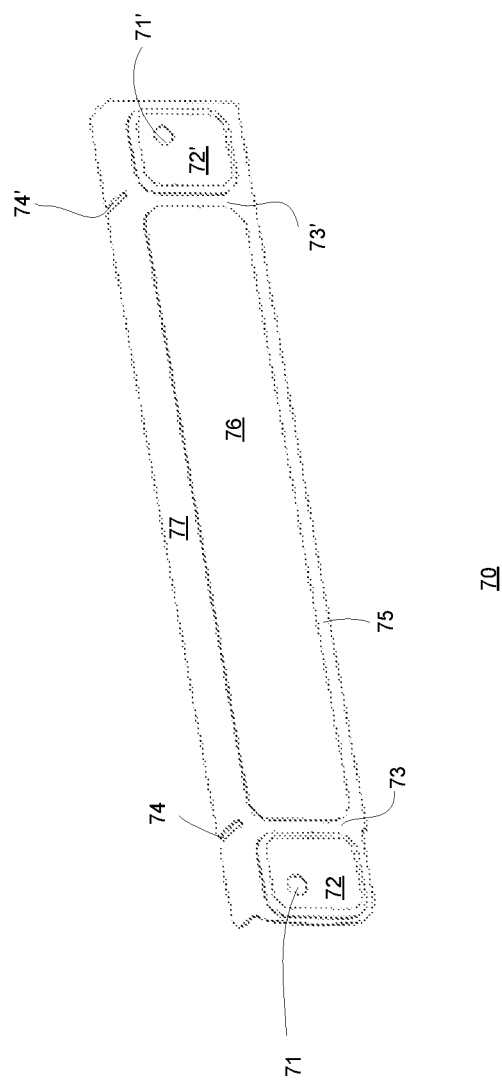

The bridges illustrated in FIG. 7 and above may be used for more static PV panels.

The allocation of bridges to PV panels may differ from those illustrated in the previous two paragraphs.

There may be provided a bridge that may include a first photovoltaic (PV) panel holder, a second PV panel holder, and a body. The body may be movably coupled, via a first interface to the first PV panel holder and may be movably coupled, via a second interface to the second PV panel holder. Wherein each one of the first PV panel holder and the second PV panel holder may include a base surface, a central segment extends from the base surface, and two side segments that extend from the base surface. A distance between the base surface and first part of the central segment exceeds a distance between the base surface and a first part of each one of the side segments. FIGS. 7-15 illustrate examples of such a bridge.

Each one of the (a) distance between the base surface and first part of the central segment, and (b) the distance between the base surface and a first part of each one of the side segment, may be of millimetric scale.

The distance between the base surface and first part of the central segment, substantially equals a sum of (b) a thickness of the body and (c) the distance between the base surface and the first part of one of the side segments.

The body may be elastic. The first and second PV holders may also be elastic.

Each one of the first interface and the second interface may be an axel, wherein the body may be rotatably coupled to the first PV panel holder and to the second PV panel holder.

A length of each one of the first interface and the second interface may be of millimetric scale.

Figure 9:
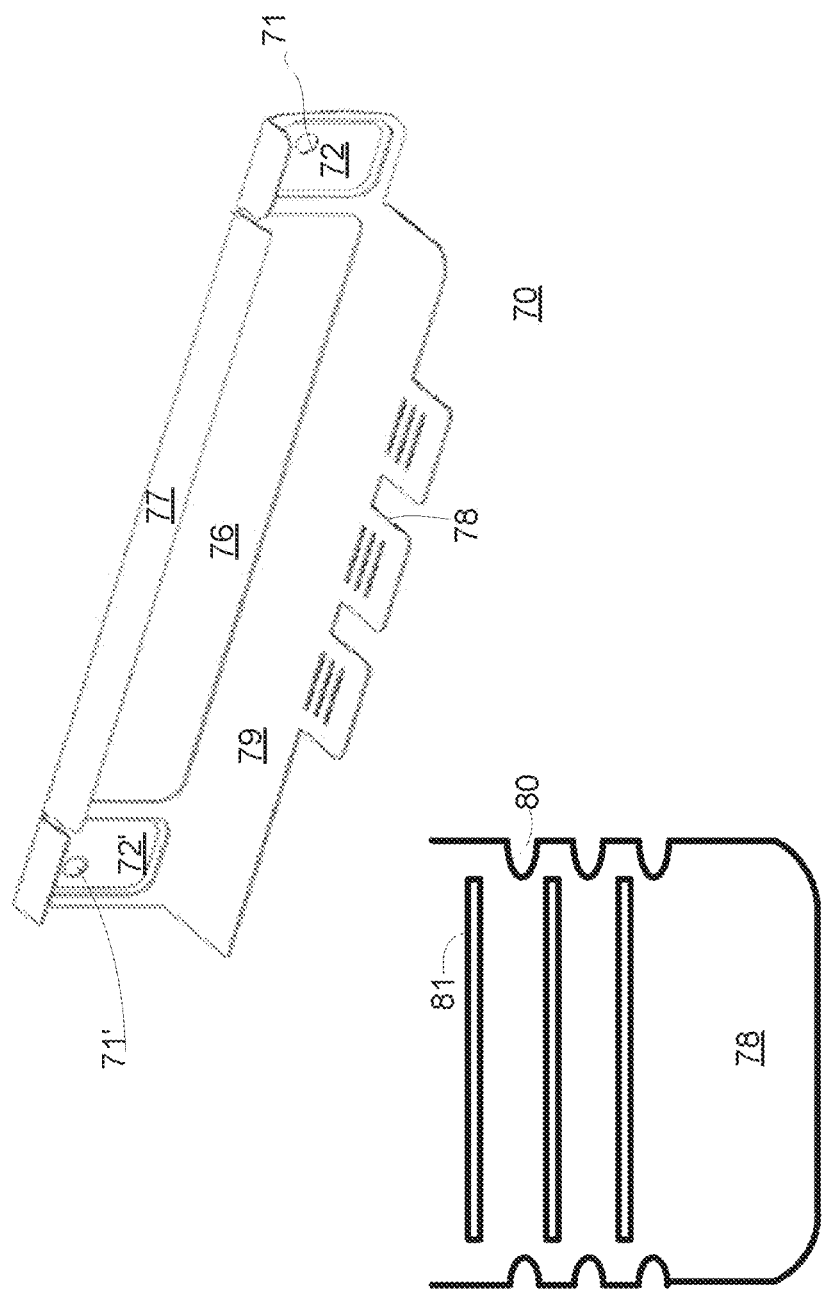
Figure 10:
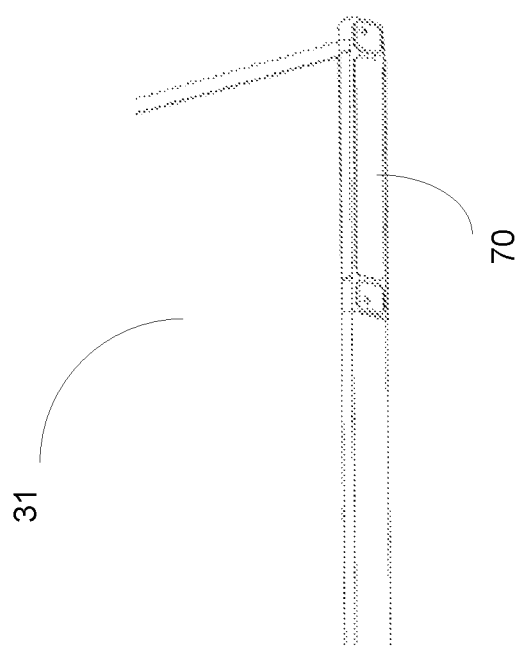
Figure 11:
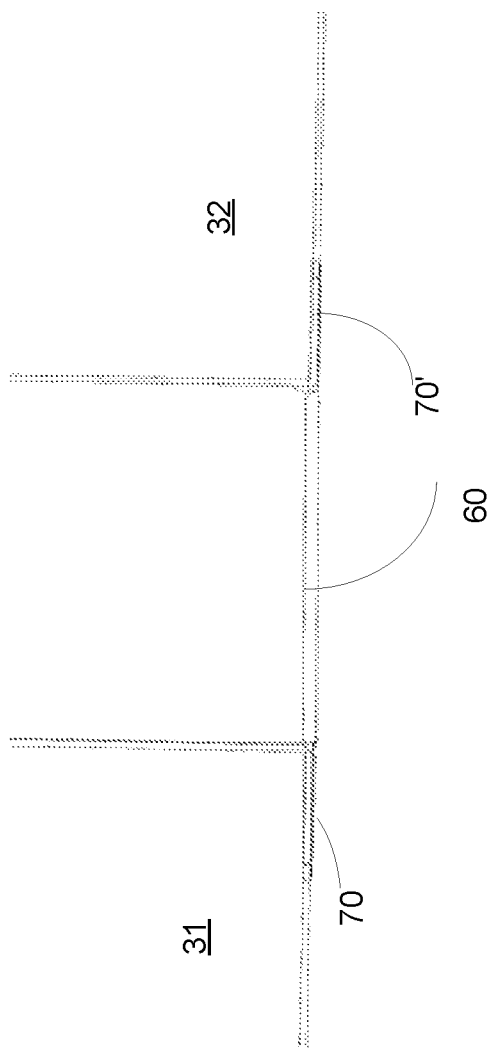
Figure 12:
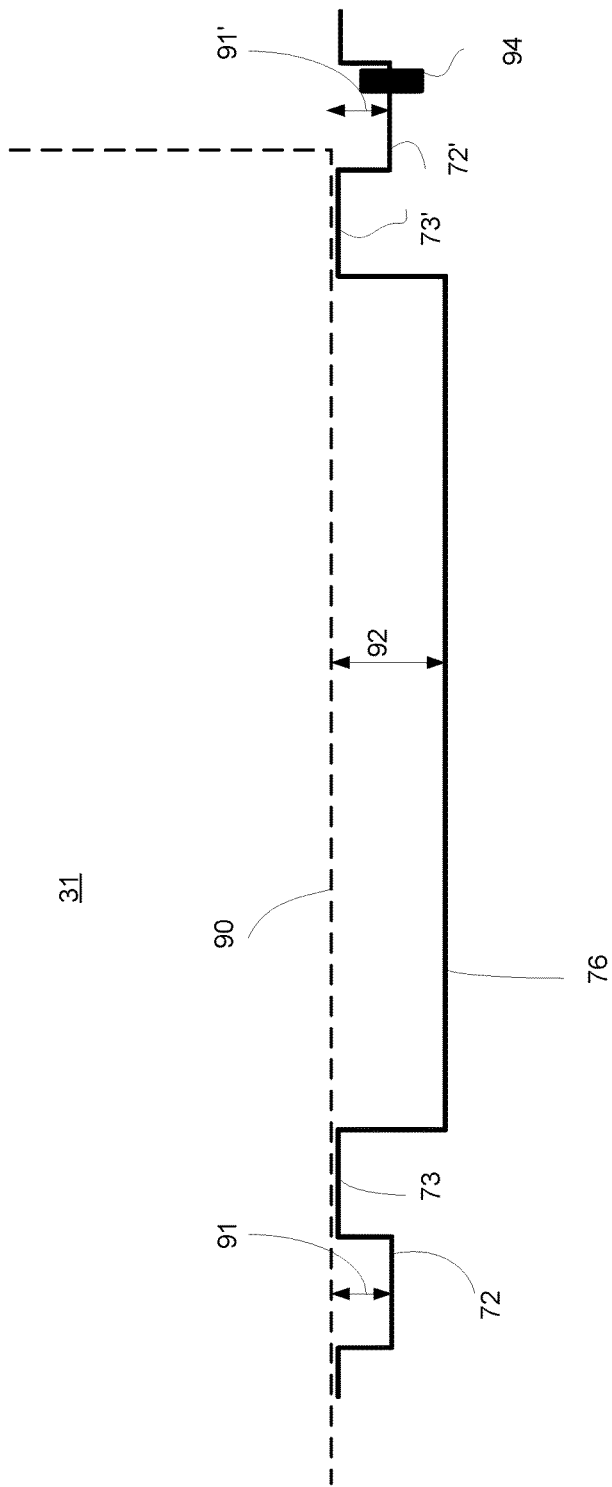
Figure 13:
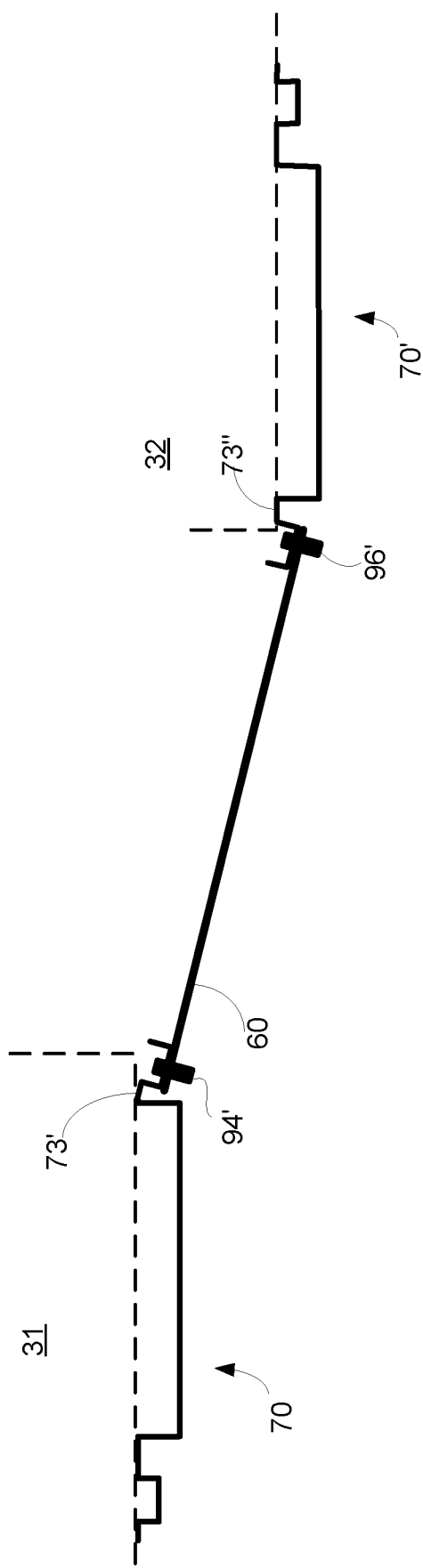
Figure 14:
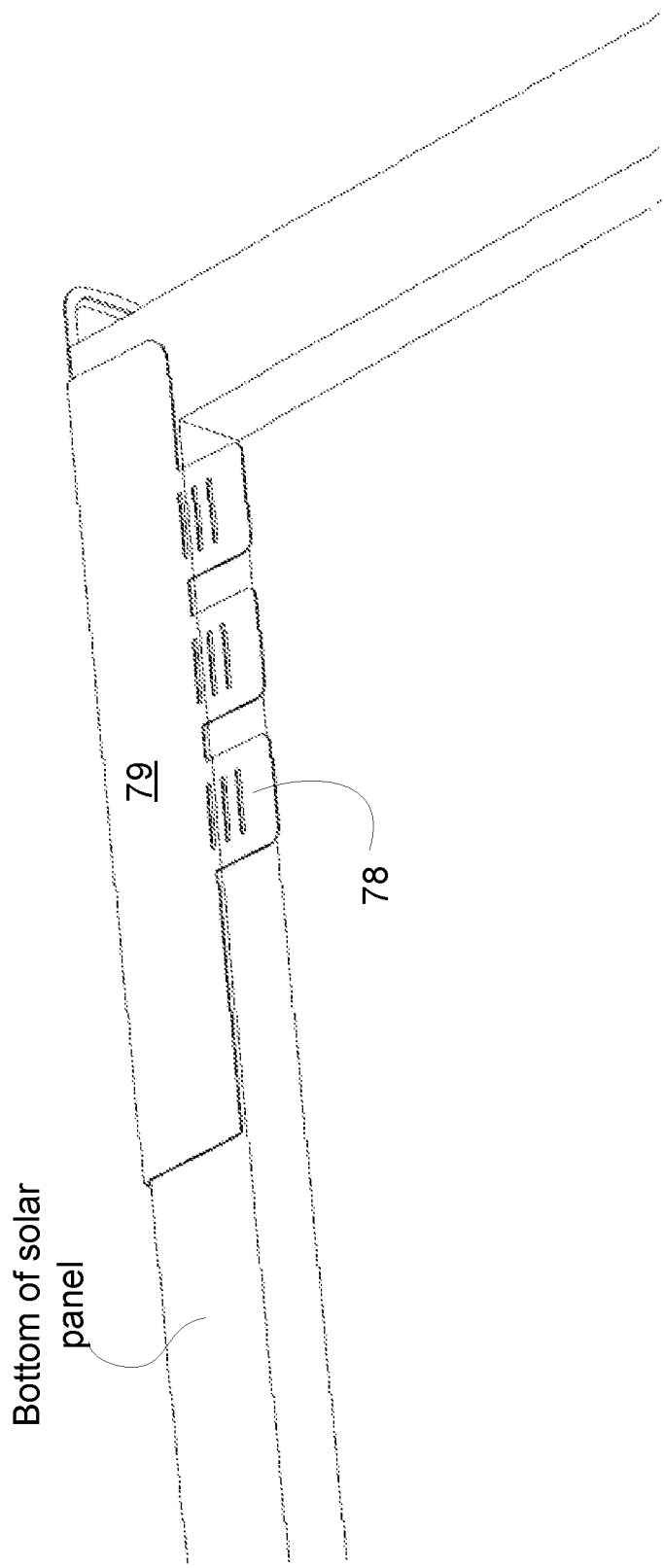
Figure 15:
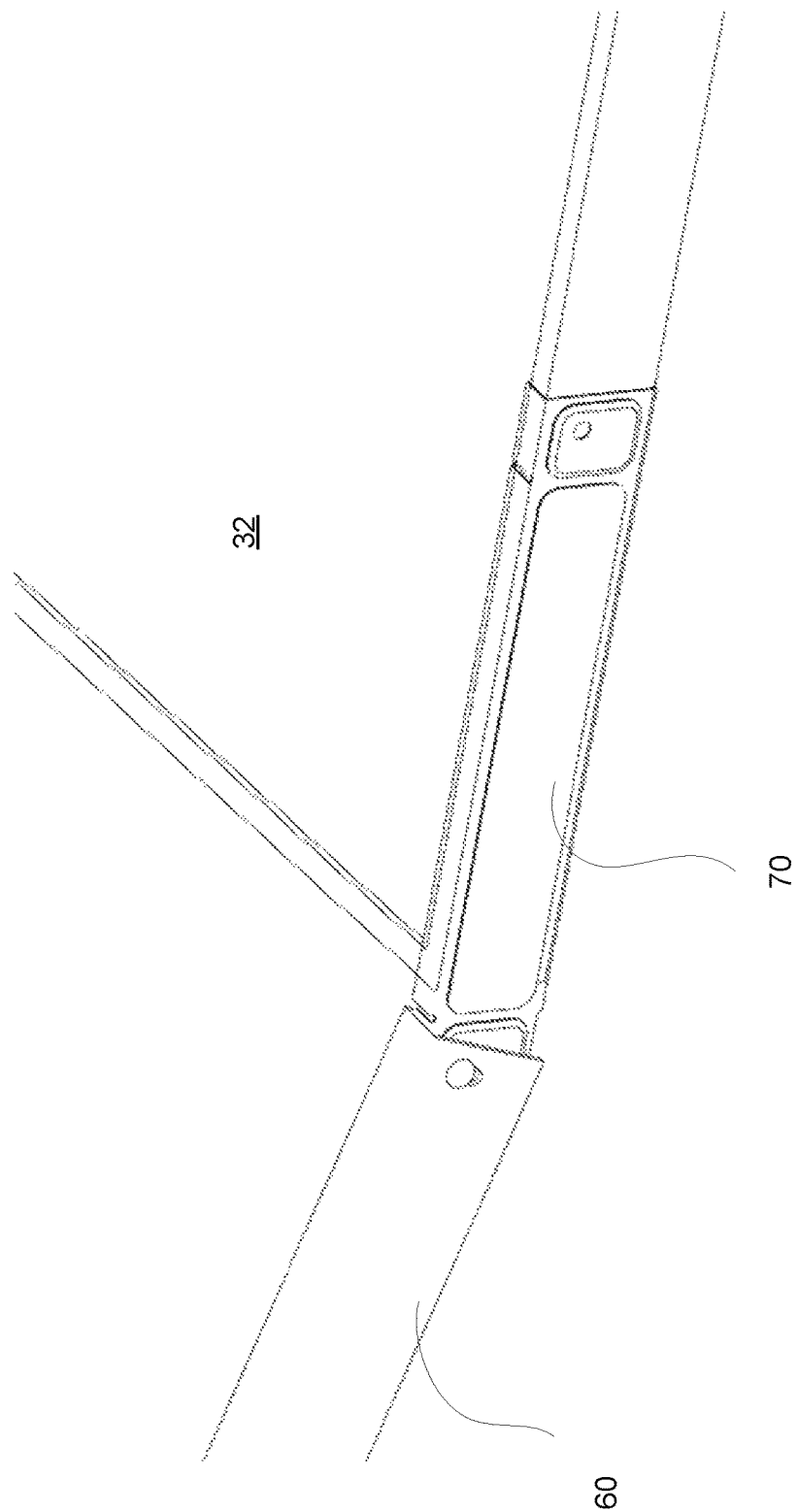

The first PV panel holder may include an upper part, an intermediate part and a lower part, wherein the lower part may be made of foldable segments denoted 78 in FIG. 9.

The foldable segments may include upper protuberances 81 and external recesses 80 that act are release cuts.

In each one of the first PV panel holder and the second PV panel holder, a base surface segment positioned between the central segment and a side segment may be configured to provide a bending region (denoted 73 in FIG. 8) for folding the body.

There may be provided a photovoltaic (PV) system may include a bridge that may include a first PV panel holder, a second PV panel holder and a body, wherein the body may be movably coupled, via a first interface to the first PV panel holder and may be movably coupled, via a second interface to the second PV panel holder; wherein each one of the first PV panel holder and the second PV panel holder may include a base surface, a central segment extends from the base surface, and two side segments that extend from the base surface, wherein a distance between the base surface and first part of the central segment exceeds a distance between the base surface and a first part of each one of the side segments; a first PV panel that may include a first plurality of PV panels and may be mechanically coupled to the first PV panel holder of the bridge; and a second PV panel that may include a second plurality of PV panels, the second PV panel may be mechanically coupled to the second PV panel holder of the bridge.

There may be provided a method for cleaning PV panels using a cleaning robot that is configured to move across one or more bridges.

FIGS. 7-15 illustrates examples of PV panels and one or more bridges. The bridges may provide a smooth path to side wheels of cleaning robots—and may form gradual steps of millimetric height differences that easily allow the side-wheels to interface with.

Different parts of the PV panel holder may located at different millimetric distances from a virtual plane to provide gradual changes in the distance between the ends of the PV panels and the exterior side of the bridge—which eases the movement of side wheels of a cleaning robot.

A pivot movement between the body and each one of the PV panel holders may be based on a spring foil and release shape or by normal pivot that allows to answer vertical step (Y axes).

The bridge includes body 60 and first and second PV panel holders 70 and 70' that are shaped and sized to allow easily mounting of the bridge on each PV panel and to allow a movement of the first and/or second PV panels holders along the PV panels (thereby allowing to adjust the bridges to different distances between the PV panels—and to changes, over time, of the distances). Thus when the PV panels expand (for example due to the heat), the bridge may fit the PV panels.

The body 60 may be movably coupled, via a first interface 94' to the first PV panel holder 70 and may be movably coupled, via a second interface 96' to the second PV panel holder 70'. Each one of the first PV panel holder and the second PV panel holder may include a base surface, a central segment extends from the base surface, and two side segments that extend from the base surface. For example—see FIGS. 8 and 9 which illustrates base surface 75, central segment 76, lower surface 79, bending regions 73 and 73', side segments 72 and 72' that extend from the base surface 79, upper slits 74 and 74' that may define an inner border of the bending regions 73 and 73', and foldable segments 78.

Each one of the central segment 76 and the side segments 72 has a surface and sidewalls that surround the surface. For simplicity of explanation reference numbers are not allocated to the sidewalls and the surfaces of the central segment 76 and of the side segments 72.

A hole 71 is formed in each of the side segments 72. The first interface 94' may extend through hole 71. The hole 71 is located on the upper side of the side segment close to the end of the bridge, which reduces the curving radius of the main body and generates a smaller gap at the presence of vertical gaps.

The bridge, even when the first interface 94' (such as but not limited to axle, screw head or flash Rivet) extends out of the hole 71 defines an upper line that may be clear with no steps.

The first and second PV panel holders may be symmetric (or substantial symmetric) about their center (right and left parts substantially symmetrical)—allowing to use the same bridge at both sides of the main body.

The bending regions 73 and 73' may bend to compensate for X-axis gaps between the PV panels.

The foldable segments 78 may have release cuts inside allow mount the bridges easily with no special tooling.

A distance (see distance 92 of FIG. 12) between the base surface (represented by dashed line 90) and first part (which is the surface) of the central segment exceeds a distance (see distances 91 and 91' of FIG. 12) between the base surface and a first part of each one of the side segments.

Distance 92 may be, for example 4 millimeters and distances 91 and 91' may be 2 millimeters—other values may be provided.

Each one of the (a) distance between the base surface and first part of the central segment, and (b) the distance between the base surface and a first part of each one of the side segment, may be of millimetric scale.

The distance between the base surface and first part of the central segment, substantially equals a sum of (b) a thickness of the body 60 and (c) the distance between the base surface and the first part of one of the side segments.

The body 60 may be elastic. The first and second PV holders may also be elastic.

Each one of the first interface and the second interface may be an axel, wherein the body 60 may be rotatably coupled to the first PV panel holder 70 and to the second PV panel holder 70'.

A length of each one of the first interface 94' and the second interface 96' may be of millimetric scale.

The first PV panel holder may include an upper part, an intermediate part and a lower part, wherein the lower part may be made of foldable segments.

The foldable segments may include upper protuberances and external recesses.

In each one of the first PV panel holder and the second PV panel holder, a base surface segment positioned between the central segment and a side segment may be configured to provide a bending region for bending the body.

In the foregoing specification, the invention has been described with reference to specific examples of embodiments of the invention. It will, however, be evident that various modifications and changes may be made therein without departing from the broader spirit and scope of the invention as set forth in the appended claims.

Moreover, the terms "front," "back," "top," "bottom," "over," "under" and the like in the description and in the claims, if any, are used for descriptive purposes and not necessarily for describing permanent relative positions. It is understood that the terms so used are interchangeable under appropriate circumstances such that the embodiments of the invention described herein are, for example, capable of operation in other orientations than those illustrated or otherwise described herein.

Any arrangement of components to achieve the same functionality is effectively "associated" such that the desired functionality is achieved. Hence, any two components herein combined to achieve a particular functionality may be seen as "associated with" each other such that the desired functionality is achieved, irrespective of architectures or intermedial components. Likewise, any two components so associated can also be viewed as being "operably connected," or "operably coupled," to each other to achieve the desired functionality.

However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps then those listed in a claim. Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

I claim:

1. A bridge that comprises:
a first photovoltaic (PV) panel holder;
a second PV panel holder; and
a body;
wherein the body is movably coupled, via a first interface to the first PV panel holder and is movably coupled, via a second interface to the second PV panel holder;
wherein each one of the first PV panel holder and the second PV panel holder comprises a base surface, a central segment that extends from the base surface, and two side segments that extend from the base surface,
wherein a distance between the base surface and a first part of the central segment exceeds a distance between the base surface and a first part of each one of the side segments;
wherein in each one of the first PV panel holder and the second PV panel holder, a base surface segment positioned between the central segment and one of the two side segments is configured to provide a bending region for bending the bridge.

2. The bridge according to claim 1, wherein each one of the (a) distance between the base surface and first part of the central segment, and (b) the distance between the base surface and a first part of each one of the side segment, ranges between two and four millimeters.

3. The bridge according to claim 1, wherein a distance between the base surface and the first part of the central segment, substantially equals a sum of (b) a thickness of the body and (c) the distance between the base surface and the first part of one of the side segments.

4. The bridge according to claim 1, wherein the body is elastic.

5. The bridge according to claim 1, wherein each one of the first interface and the second interface is an axle, wherein the body is rotatably coupled to the first PV panel holder and to the second PV panel holder.

6. A bridge that comprises:
a first photovoltaic (PV) panel holder;
a second PV panel holder; and
a body;
wherein the body is movably coupled, via a first interface to the first PV panel holder and is movably coupled, via a second interface to the second PV panel holder;
wherein each one of the first PV panel holder and the second PV panel holder comprises a base surface, a central segment that extends from the base surface, and two side segments that extend from the base surface,
wherein a distance between the base surface and a first part of the central segment exceeds a distance between the base surface and a first part of each one of the side segments;
wherein the first PV panel holder comprises an upper part, an intermediate part and a lower part, wherein the lower part is made of foldable segments.

7. The bridge according to claim 6, wherein the foldable segments comprise upper protuberances and external recesses.

8. The bridge according to claim 6, wherein in each one of the first PV panel holder and the second PV panel holder, a base surface segment positioned between the central segment and a side segment is configured to provide a bending region for bending the bridge.

9. A photovoltaic (PV) system comprising:
a bridge that comprises a first PV panel holder, a second PV panel holder and a body, wherein the body is movably coupled, via a first interface to the first PV panel holder and is movably coupled, via a second interface to the second PV panel holder; wherein each one of the first PV panel holder and the second PV panel holder comprises a base surface, a central segment that extends from the base surface, and two side segments that extend from the base surface, wherein a distance between the base surface and a first part of the central segment exceeds a distance between the base surface and a first part of each one of the side segments;

a first PV panel that comprises a first plurality of PV panels and is mechanically coupled to the first PV panel holder of the bridge; and a second PV panel that comprises a second plurality of PV panels, the second PV panel is mechanically coupled to the second PV panel holder of the bridge; wherein in each one of the first PV panel holder and the second PV panel holder, a base surface segment positioned between the central segment and one of the two side segments is configured to provide a bending region for bending the bridge.

10. The PV system according to claim 9, wherein each one of the (a) distance between the base surface and first part of the central segment, and (b) the distance between the base surface and a first part of each one of the side segment, ranges between two and four millimeters.

11. The PV system according to claim 9, wherein a distance between the base surface and the first part of the central segment, substantially equals a sum of (b) a thickness of the body and (c) the distance between the base surface and the first part of one of the side segments.

12. The PV system according to claim 9, wherein the body is elastic.

13. The PV system according to claim 9, wherein each one of the first interface and the second interface is an axle, wherein the body is rotatably coupled to the first PV panel holder and to the second PV panel holder.

14. The PV system according to claim 9, wherein the first PV panel holder comprises an upper part, an intermediate part and a lower part, wherein the lower part is made of foldable segments.

15. The bridge according to claim 14, wherein the foldable segments comprise upper protuberances and external recesses.

* * * * *